United States Patent [19]

Abu-Shumays et al.

[11] Patent Number: 5,000,506
[45] Date of Patent: Mar. 19, 1991

[54] SUN SHADES FOR AUTOMOBILES

[76] Inventors: Ibrahim K. Abu-Shumays; Mary D. Abu-Shumays, both of 1248 Varner Rd., both of Pittsburgh, Pa. 15227

[21] Appl. No.: 451,942

[22] Filed: Dec. 18, 1989

Related U.S. Application Data

[63] Continuation-in-part of Ser. No. 387,784, Aug. 1, 1989, Pat. No. 4,919,468, which is a continuation-in-part of Ser. No. 158,846, Feb. 22, 1988, abandoned.

[51] Int. Cl.$^5$ .............................................. B60J 3/00
[52] U.S. Cl. .................................... 296/97.8; 296/97.4
[58] Field of Search .................... 296/97.8, 97.4, 97.6, 296/97.11

[56] References Cited

U.S. PATENT DOCUMENTS

| | | | |
|---|---|---|---|
| 1,848,090 | 3/1932 | Stein | 296/97.11 X |
| 2,289,644 | 7/1942 | Gano | 296/97.11 X |
| 2,358,173 | 9/1944 | McFadyen | 296/97.11 |
| 2,559,471 | 7/1951 | Schrock | 296/97.11 |
| 2,877,050 | 3/1959 | Isola et al. | 296/97.8 |
| 3,649,068 | 3/1972 | Moynihan | 296/97.8 |
| 4,468,062 | 8/1984 | Marcus et al. | 296/97.8 |
| 4,558,899 | 12/1985 | Chu et al. | 296/97.8 |
| 4,671,558 | 6/1987 | Cline | 296/97.8 X |
| 4,824,160 | 4/1989 | Fleming | 296/97.8 X |
| 4,844,530 | 7/1989 | Mahler et al. | 296/97.8 X |
| 4,932,710 | 6/1990 | Chen | 296/97.8 X |

FOREIGN PATENT DOCUMENTS

| | | | |
|---|---|---|---|
| 279765 | 12/1967 | Australia | 296/97.11 |
| 904743 | 2/1954 | Fed. Rep. of Germany | 296/97.11 |
| 1285392 | 1/1962 | France | 296/97.11 |
| 67621 | 4/1986 | Japan | 296/97.11 |
| 874658 | 8/1961 | United Kingdom | 296/97.11 |

Primary Examiner—Margaret A. Focarino
Assistant Examiner—Joseph D. Pape

[57] ABSTRACT

This invention introduces a single sun shade for a windshield, and a double sun shade for a side window of an automobile. The sun shades are capable of independently and simultaneously covering top adjacent parts of a windshield and a side window, whenever it is desirable to do so. A side window typically has a trapezoidal shape which is a composite of rectangular and triangular parts. The double shade also has a rectangular part and a triangular part and is capable of covering a top part, a corner, and a slanted part of a side window. The motions of the shades can also be actuated by electric motors.

5 Claims, 2 Drawing Sheets

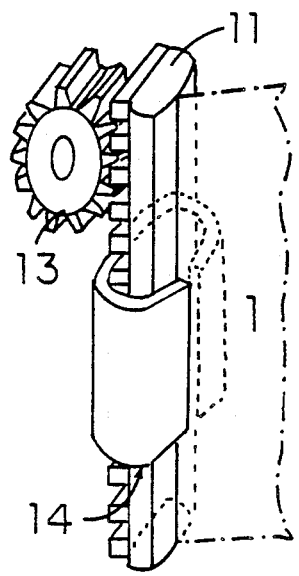
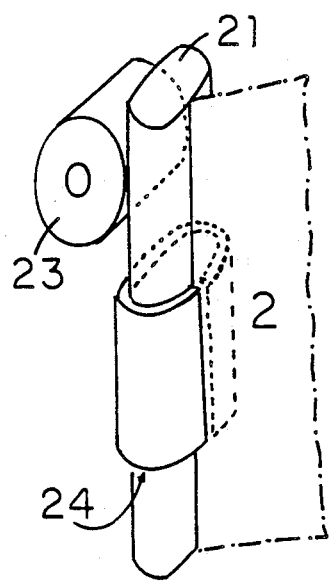
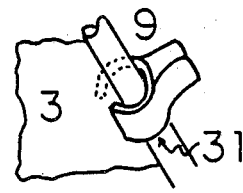
FIG. 4.   FIG. 5.   FIG. 6.
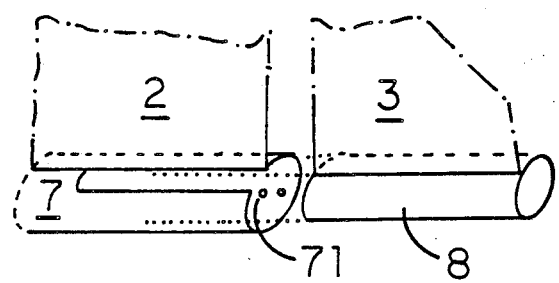
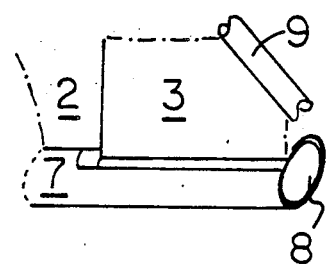
FIG. 7.   FIG. 8.

SUN SHADES FOR AUTOMOBILES

This is a continuation-in-part of application Ser. No. 387,784 filed 08/01/89, now U.S. Pat. No. 4,919,468 which is a continuation-in-part of application Ser. No. 158,846 filed 02/22/88, now abandoned.

BACKGROUND OF THE INVENTION

1. Field of the Invention

This invention relates to improvements to sun visors for passenger cars and other vehicles aimed at protecting the eyes and enhancing visibility and comfort of the driver, the front seat passenger, and also other passengers.

2. Description of the Prior Art

Current passenger cars and similar vehicles (vans, trucks, etc.) are equipped with a single sun visor on the driver side and another on the passenger side. Each visor is movable and can cover at any one time only the front windshield, or a front side window but not both. Curtains are available but are not practical for the front windshield or slanted sides of windows.

Shades are introduced here for added safety and comfort, especially in certain situations when it is desirable to simultaneously cover critical adjacent locations of both a side window and the front windshield.

The main advantage here over prior art is the fact that actuating the shades does not require a driver to move his head, as is some times the case when a visor is moved from a position along the front windshield to a position along a side window. Another advantage is the novelty of the design and the simplicity of manual or automatic operation.

SUMMARY OF THE INVENTION

This invention introduces sun shades for use on a windshield or a side window of an automobile or a vehicle. This is in order to block sun rays coming from certain locations in order to ensure comfort and safety of the driver and other passengers.

The shades introduced here can be moved manually, can be moved at the touch of a conveniently located button connected to the vehicle's electric system, and the motion in the latter case can also be triggered when sun rays of a prescribed pre-selected intensity strike conveniently located photocells.

No mention is made here of the material to construct the shades. It may be plastic, woodboard, metal, fabric, etc., or a combination of different materials. It is to be designed to match or contrast with a vehicle's interior decoration. Exact dimensions are not mentioned, since this is a relative matter and can be varied.

BRIEF DESCRIPTION OF THE DRAWINGS

The following drawings illustrate examples of the basic shapes which are the subject of this invention.

FIGS. 2 to 8 present exploded and cut out views of possible designs of shades, 1 for the front (or back) windshield, and the combination 2 and 3 for a front (or back) side window. The motion of 1 and 2 can be accomplished manually and can also be automated. The motion of the part of the shade 3 (shown apart from 2 befor assembly in FIG. 7 for illustration only, shown in the fragmentary view of FIG. 8 mostly overlapping with 2 in the raised stored position, and shown in FIGS. 1 and 3 in the lowered used position) follows, and is controlled by, the motion of 2.

DESCRIPTION OF THE PREFERRED EMBODIMENTS

Figure 1:
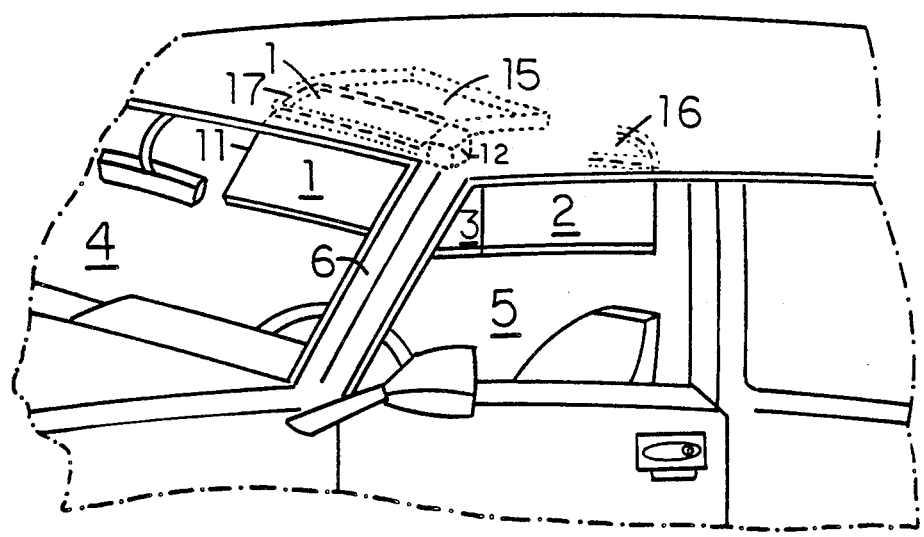
FIG. 1 is a perspective outside view of parts of a car showing a single shade 1 and a double shade 2-3 in a position to provide a continuous cover over adjacent corners and top parts of a front windshield and a side window. Shades can also be installed on the front passenger's side of a car and on other car windows. Note from FIG. 1 that a front side window typically has a trapezoidal shape which is composite of rectangular (See 2) and triangular (See 3) parts.
Figure 2:
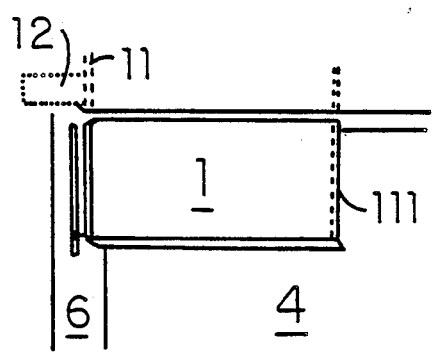

The main objective of this invention is to contribute to safety and at the same time add to the comfort and convenience of a driver and passengers of an automobile or similar vehicle. This is accomplished making it possible to independently cover top parts of a front windshield, a back windshield, front side windows, and back side windows.

Examples of the preferred embodiments of this invention are shown in FIGS. 1 to 8. The main idea here is to use sun shades in place of visors on one or all of (the front or back) windshields and (front or back) side windows.

The possible designs of the single shade 1 for the front or back windshield, and part 2 of the double shade for side windows, is straightforward. Here, for example, the shade 1 has a thick border. The lower part of the border makes it easier to move the shade up and down and prevents the shade from being drawn totally inside its compartment 15 shown in FIG. 1 inside the top layer of the vehicle. The left border 11 or 21 (the same comments related to the border 11 apply to the border 21 corresponding to FIGS. 3 and 5) in the illustration of FIGS. 2, 4, and 5 would have an appropriate cross section which fits in a groove 14 or 24 just above the windshield or the side window. This border may also have teeth as illustrated in the expanded view of FIG. 4.

Two expanded fragmentary views of possible shapes of the borders 11 and 21 are shown in FIGS. 4 and 5. Also shown in FIGS. 1–5 are: a motor 12 (dotted lines), and expanded views of possible motor driven friction 23 (for border with no teeth) or spur 13 (for border with teeth) gears. The gear engages the border 11 or 21 and serves to automate its motion and the motion of the shade. The border 11 or 21 may be made of hard plastic or another durable material and its motion may be driven manually or as mentioned above by contact with, and rotation of a friction or spur gear, the gear being adjacent to said groove and being connected with the motor.

The shade may remain relatively flat when it is withdraw inside its compartment 15.

Figure 3:
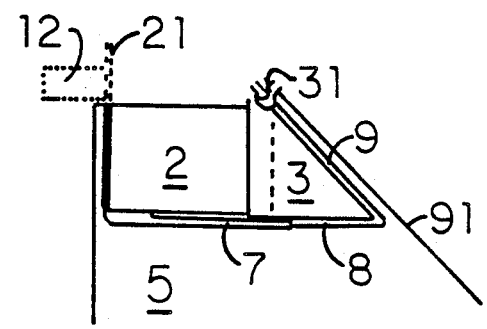

It would be fine for the shade 1 to move vertically up or down within a range of desirable levels. Alternatively, if it is desirable for the shade to move parallel to the windshield, then a hook or a ball extension is added to the visible end of 11 in such a way that the hook or ball extension can move freely in a track on the pillar 6 which run parallel to the edge of the windshield; the rigid parts of the end of 11 and of the bottom border around the shade serve in the present case to retain the shade 1 essentially parallel to the windshield. A preferred arrangement is to have two borders of 1, border 11 and the border 111 parallel to it, be made of sufficiently rigid material and to be of sufficient length in the hidden compartment part of the shade, as is shown in the edge 17 in FIG. 1 so that the tendency of the borders, say 11 and 17, to remain as close to straight lines as possible induces the visible part of the shade 1 to remain parallel to the windshield. Note in contrast that the vertical part of the shade 2 shown in a dashed line in FIG. 3 is to be made as thin as possible so as not to interfere with the possible motion of the triangular 3 and rectangular 2 parts of the double shade relative to each other. Only part of the compartment 16 of the double shade 2-3 is shown in FIG. 1 for clarity.

The possible design of double shades 2 and 3 for a front or back side window is also straightforward. Here the part 2 is made in the same way as 1 described above for the windshield, except that here vertical motion is perfectly acceptable. The motion of 1 and 2 can be accomplished manually or via a motor, and the turning on of the motor can be induced by pressing a button or can be triggered by sun rays striking conveniently located photocells.

As shown in FIGS. 7 and 8, the part of the bottom border 7 of the shade 2 adjacent to the double shade component 3 is made of a partly curved plate in the form of a letter C turned 90 degrees counter clockwise; the plate has a smooth inside; ball bearings 71 may also be installed inside 7 in the location indicated by small circles in FIG. 7. The bottom part 8 of the shade 3 is partly in, and fits and moves smoothly in and out of the border 7 as is implied in FIGS. 3 and 8. The border 7 surrounds part of 8 in the lowered used position, and most of 8 in the raised stored position. These borders cannot be moved up and down independently. The slanted border 9 of the shade 3 has an oval or circular cross section and its motion is guided by a groove 31 fixed above a corner of a front window.

As a result of the above described arrangement of FIGS. 3 and 4, whenever the shade 2 is moved up or down into a desired place, it automatically pulls the shade 3 and induces this shade 3 to move along a line parallel to the slanted side 91 of a front or back side window 5. Automating the motion of the shade 2 is sufficient and serves directly to control the motion of 3. Finally, the design of the shades 2 and 3 can also be used for other windows which have composite rectangular and triangular parts.

Clearly, it is possible to have sun visors for the front windshield and shades for the front side windows, or vice versa, as well as to use different types of different windows.

While we have illustrated and described several embodiments of our invention, it will be understood that these are by way of illustration only and that various changes, extensions, modifications, and applications may be contemplated in this invention and within the scope of the claims given below. For example, the shape of the shade of FIG. 2 need not be rectangular and its bottom side and right side may be modified. The term predominently rectangular as used in the claim refers to the possibility of contemplated shape modifications.

We claim:

1. A double shade for use to cover a corner and top part of a side window of an automobile; said side window has a trapezoidal shape which is a composite of rectangular and triangular parts;

said double shade is comprised of a rectangular part and a right angle triangular part with overlapping sections; the function of said triangular part is to cover a slanted top part of said side window during a lowered used position; said rectangular part has the bottom and one of its left and right borders modified; the modification being (a) to provide the border which does not overlap with said right angle triangular part with a cross section which fits in a groove just above the side window, the fit between the groove and the border being sufficiently tight to hold the border and double shade in place in any desirable position, yet is sufficiently loose to make it easy to move said double shade, and (b) to design the bottom border to have a partly curved plate in the form of a letter C turned 90 degrees counter clockwise; said curved plate has smooth inside and surrounds part of the bottom border of said right angle triangular part of the double shade;

the bottom border of said triangular part of the double shade fits partly and moves smoothly in and out of the curved plate border of said rectangular part of the double shade; the bottom borders of both parts of said double shade cannot be moved up and down independently;

the border along the hypotenuse of said triangular part of the double shade is designed to have a suitable cross section and its motion is guided loosely by a groove fixed above a corner of a window; whenever said rectangular part of said double shade is moved up or down, it automatically pulls said triangular part and induces said triangular part to move along a line parallel to the slanted side of a side window;

said double shade can also be used for other windows which have composite rectangular and triangular parts.

2. A double shade as recited in claim 1 wherein said shade can be actuated manually and can also be actuated by motor means.

3. A shading system for automobiles based on a combination of a single shade and a double shade, one combination on the driver's side and one on the front seat passenger's side of an automobile; the system is capable in certain situations of simultaneously providing a continuous cover over adjacent corners and top parts of a front windshield and a front side window of said automobile;

the function of said single shade is to cover a corner and top part of a front windshield of an automobile;

the function of said double shade is to cover a corner and top part of a front side window of an automobile; said front side window has a trapezoidal shape which is a composite of rectangular and triangular parts; said double shade has a compartment in a top interior part of said automobile;

said double shade for a front side window is comprised of a rectangular part and a right angle triangular part with overlapping sections; the function of said triangular part is to cover a slanted top part of said front side window during a lowered used position; said rectangular part has the bottom and one of its left and right borders modified; the modification being (a) to provide the border which does not overlap with said right angle triangle part with a cross section which fits in a groove just above the side window, the fit between the groove and the border being sufficiently tight to hold the border and double shade in place in any desirable position, yet is sufficiently loose to make it easy to move said double shade, and (b) to design the bottom border to have a partly curved plate in the form of a letter C turned 90 degrees counter clockwise; said curved plate has a smooth inside and surrounds part of the bottom border of said right angle triangular part of the double shade;

the bottom border of said triangular part of the double shade fits partly and moves smoothly in and out of the curved plate border of said rectangular part of the double shade; the bottom borders of both parts of said double shade cannot be moved up and down independently;

the border along the hypotenuse of said triangular part of the double shade is designed to have a suitable cross section and its motion is guided loosely by a groove fixed above a corner of a front side window; whenever said rectangular part of said double shade is move up or down, it automatically pulls said triangular part and induces said triangular part to move along a line parallel to the slanted side of said front side window.

4. A shading system for automobiles as recited in claim 3 wherein said single shade and said double shade can be actuated manually and can also be actuated by motor means.

5. A double shade having a trapezoidal shape for covering an area of an automobile window; said double shade being comprised of two distinct and overlapping parts including a first part and a second part; said second part being horizontally slidable relative to said first part so that the area covered by the double shade expands in a horizontal direction as the double shade is lowered and contracts in a horizontal direction as the double shade is raised.

* * * * *